(12) United States Patent
Hammes et al.

(10) Patent No.: US 8,831,071 B2
(45) Date of Patent: Sep. 9, 2014

(54) COMMUNICATION DEVICE WITH TESTING

(75) Inventors: Markus Hammes, Dinslaken (DE); Stefan Van Waasen, Xanten (DE)

(73) Assignee: Intel Mobile Communications GmbH, Neubiberg (DE)

( * ) Notice: Subject to any disclaimer, the term of this patent is extended or adjusted under 35 U.S.C. 154(b) by 332 days.

(21) Appl. No.: 12/690,909

(22) Filed: Jan. 20, 2010

(65) Prior Publication Data
US 2011/0176582 A1 Jul. 21, 2011

(51) Int. Cl.
*H04B 1/00* (2006.01)
*G01S 19/23* (2010.01)
*G01S 19/36* (2010.01)

(52) U.S. Cl.
CPC .............. *G01S 19/235* (2013.01); *G01S 19/36* (2013.01)
USPC .......... 375/150; 375/224; 455/39; 455/115.2; 343/702

(58) Field of Classification Search
USPC ............... 375/147, 150, 224; 455/226.1, 118; 324/613, 622, 638, 642, 650
See application file for complete search history.

(56) References Cited

U.S. PATENT DOCUMENTS

| 5,337,014 A * | 8/1994 | Najle et al. ................... 324/613 |
| 5,977,779 A * | 11/1999 | Bradley ........................ 324/638 |
| 6,961,547 B2 * | 11/2005 | Rozenblit et al. .............. 455/118 |
| 2004/0002331 A1 | 1/2004 | Greenspan et al. |
| 2006/0197538 A1 | 9/2006 | Leinonen et al. |
| 2010/0060531 A1 * | 3/2010 | Rappaport .................... 343/702 |
| 2010/0184392 A1 * | 7/2010 | Largey et al. .............. 455/115.2 |

* cited by examiner

*Primary Examiner* — Leon-Viet Nguyen

(57) ABSTRACT

Communication devices and methods are disclosed, wherein a test signal is generated at a first frequency and a higher harmonic of said test signal is received and processed at a second frequency higher than said first frequency.

12 Claims, 6 Drawing Sheets

COMMUNICATION DEVICE WITH TESTING

FIELD OF THE INVENTION

The present application relates to communication devices with testing capabilities and to corresponding methods.

BACKGROUND OF THE INVENTION

In communication devices signals may be received from other communication devices. The components or circuit portions of the communication device which are used for receiving such signals may be referred to as receive path. For example, in some kinds of wireless communication devices, the receive path receives radio frequency (RF) signals and performs one or more operations like conversion to a baseband frequency, demodulation, equalizing and the like.

To test such receive paths, conventionally dedicated testing equipment is used, for example during post-production tests. This dedicated test equipment then generates test signals to be processed by the receive path. The use of such dedicated test equipment causes extra costs and is limited in its flexibility of use, for example it is difficult to regularly test a receive path during use with such dedicated testing equipment.

BRIEF SUMMARY OF THE INVENTION

In an embodiment, a communication device is provided. The communication device may include:
a first circuit portion configured to generate a test signal at a first frequency, and a second circuit portion configured to receive and process a higher harmonic of the test signal for test purposes at a second frequency, said second frequency being greater than said first frequency.

It should be noted that the above summary is only intended to provide an abbreviated overview over some features of some embodiments of the present invention and is not to be construed as limiting. In particular, other embodiments may comprise less features, more features and/or alternative features.

DETAILED DESCRIPTION OF THE INVENTION

Figure 1:
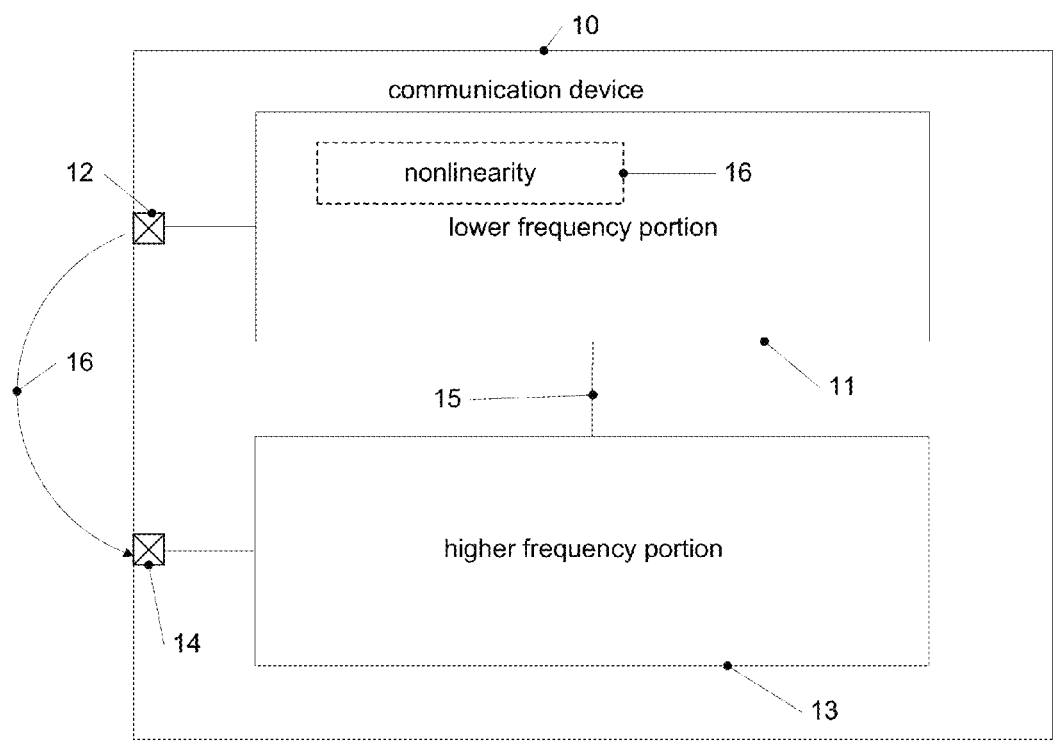
FIG. 1 shows a block diagram of a communication device according to an embodiment.

In the following, some embodiments of the present invention will be described in detail. It is to be understood that the following description is given only for the purpose of illustration and is not to be taken in a limiting sense. The scope of the invention is not intended to be limited by the embodiments described hereinafter with reference to the accompanying drawings, but is intended to be limited only by the appended claims and equivalents thereof.

It is also to be understood that in the following description of embodiments any direct connection or coupling between functional blocks, devices, components, circuit elements or other physical or functional units shown in the drawings or described herein could also be implemented by an indirect connection or coupling, i.e. a connection or coupling comprising one or more intervening elements. Furthermore, it should be appreciated that functional blocks or units shown in the drawings may be implemented as separate circuits in some embodiments, but may also be fully or partially implemented in a common circuit in other embodiments. In other words, the description of various functional blocks is intended to give a clear understanding of various functions performed in a device and is not to be construed as indicating that these functional blocks have to be implemented as separate physical units. For example, one or more functional blocks may be implemented by programming a processor like a single digital signal processor accordingly.

It is further to be understood that any connection which is described as being wire-based in the following specification may also be implemented as a wireless communication connection and vice versa unless noted to the contrary.

It should be noted that the drawings are provided to give an illustration of some aspects of embodiments of the present invention and therefore are to be regarded as schematic only. In particular, the elements shown in the drawings are not necessarily to scale with each other, and the placement of various elements in the drawings is chosen to provide a clear understanding of the respective embodiment and is not to be construed as necessarily being a representation of the actual relative location of the various components and implementations according to embodiments of the invention.

The features of the various embodiments described herein may be combined with each other unless specifically noted otherwise. On the other hand, describing an embodiment with a plurality of features is not to be construed as indicating that all those features are necessary for practicing the present invention, as other embodiments may comprise less features and/or alternative features.

Turning now to the figures, in FIG. 1 a communication device 10 according to an embodiment of the present invention is shown. Communication device 10 may for example be implemented as one or more integrated circuits, possibly in combination with additional elements like resistors, capacitances, antennas and the like.

Communication device 10 comprises a higher frequency portion 13 and a lower frequency portion 11. Higher frequency portion 13 is configured to at least partially operate at a first frequency, also referred to as higher frequency, and lower frequency portion 11 is configured to operate at least partially at a second frequency, also referred to as lower frequency, which is lower than the first frequency. In other words, in the context of FIG. 1 "higher frequency" and "lower frequency" are relative terms and are not to be construed as indicating any absolute magnitude of frequency. It should be noted that higher frequency portion 13 may also operate at a plurality of different operating frequencies, one of which is the first frequency, and lower frequency portion 11 may also operate at a plurality of different operating frequencies, one of which is the second frequency. Such further operating frequencies of the higher frequency portion 13 and/or lower frequency portion 11 may have any magnitude and in particular individually may be equal to, higher or lower than the first and/or second frequency.

Higher frequency portion 13 is configured to receive signals at the first frequency via a terminal 14. Terminal 14 may be a pin for receiving wire-bound signals or may also comprise or be configured to be connected to an antenna for receiving wireless signals.

Lower frequency portion 11 is configured to generate signals at the second frequency and to output them at a terminal 12.

In an embodiment, lower frequency portion 11 and/or higher frequency portion 13 comprise digital circuitry. Additionally or alternatively, higher frequency portion 13 and/or lower frequency portion 11 may comprise analog circuitry.

In the embodiment of FIG. 1, communication device 10 has a first mode of operation, which may also be referred to as regular mode, where communication signals are processed by higher frequency portion 13 and/or lower frequency portion 11. For example, higher frequency portion 13 may receive signals with the first frequency via terminal 14, downconvert them to the second frequency or to an intermediate frequency and forward them to lower frequency portion 11 via a connection 15, and lower frequency portion 11 may process the signals at the second frequency, for example demodulate the signals, and output them via terminal 12 or any other (not shown) terminal.

In this application, it should be noted that the conversion from the first frequency to the second frequency needs not necessarily take place in the higher frequency portion 13, but may also be performed in lower frequency portion 11 or in an additional circuit portion (not shown).

In a second mode of operation, which also may be referred to as test mode, lower frequency portion 11 generates test signal at the second frequency and outputs them via terminal 12. In the embodiment of FIG. 1, lower frequency portion 11 and/or terminal 12 may comprise a non-linearity 16. Non-linearity 16 may be a non-linearity deliberately introduced for the second mode of operation or may be an inherent non-linearity of components used, for example an inherent non-linearity of a logic gate, a limiter, a terminal like a pad, or any other circuit component.

Due to non-linearity 16, the test signal output at terminal 12 comprises higher harmonics, i.e. frequency components at or around integer multiples of the second frequency.

As indicated by an arrow 16, in the second mode of operation higher frequency portion 13 receives the test signal output at terminal 12, for example in a wireless manner or also via a wire-based communication connection. In particular, higher frequency portion 13 receives a higher harmonic component with a frequency at or near the first frequency and uses this higher harmonic of the test signal for testing purposes.

Therefore, in the embodiment of FIG. 1 a portion operating at a lower frequency is used to generate test signals for a portion using a higher frequency by using a higher harmonic of a lower frequency signal.

This principle explained with reference to FIG. 1 may be used in a plurality of different applications or environments, some of which will be described below in more detail.

Figure 2:
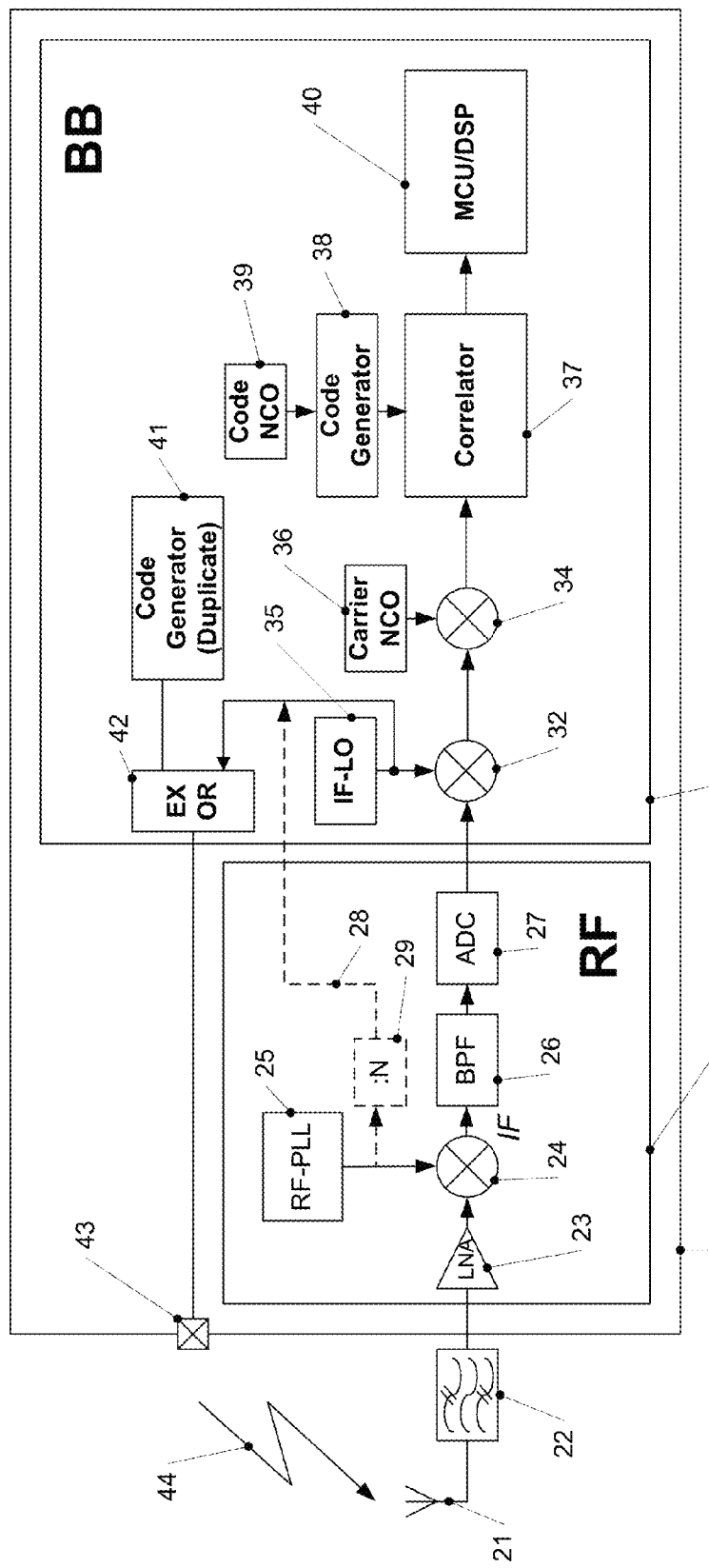
FIG. 2 shows a block diagram of a communication device according to a further embodiment.

For example, in FIG. 2 a GPS receiver according to an embodiment is shown. The GPS receiver of the embodiment of FIG. 2 comprises an antenna 21, a bandpass filter 22 and processing circuitry 20. Processing circuitry 20 may be implemented as one or more integrated circuits and comprises a radio frequency (RF) portion 30 and a baseband (BB) portion 31. The GPS receiver of the embodiment of FIG. 2 may be operated in a first mode of operation, which may also be referred to as a regular mode, for receiving and decoding GPS signals received e.g. from GPS satellites, or in a second mode of operation, also referred to as test mode, for testing purposes. First, the first mode of operation will be briefly described.

In the first mode of operation, the GPS receiver of FIG. 2 receives GPS signals, for example from one or more GPS satellites, via antenna 21. The received signals are filtered in bandpass filter 22 and then passed on to radio frequency portion 30. In radio frequency portion 30, the signals are amplified by a linear amplifier 23 and mixed with a signal generated by a radio frequency phase-locked loop 25 in a mixer 25 to generate an intermediate frequency (IF) signal, for example a signal at or around 4 MHz.

The thus mixed signal is filtered by a bandpass filter 26 and converted to a digital signal by an analog-to-digital converter 27.

The thus generated digital signal is then forwarded to baseband portion 31.

In baseband portion 31, the signal is mixed in a mixer 32 with a local oscillator signal generated by a local oscillator 35 operating at an intermediate frequency and subsequently mixed with a carrier frequency generated by a numerically controlled oscillator (NCO) 36 operating at a carrier frequency in a mixer 34, thus down-converting the signal to a baseband frequency.

As in GPS signals received from satellites, the signal is usually quite weak, in most cases considerably weaker than the noise level, e.g. thermal noise. In case of GPS the signal comprises signal codes, and in order to receive the sent codes a correlator 37 is provided. In correlator 37, the received signal is correlated with codes generated by a code generator 38 based on a signal supplied by a numerically controlled oscillator 39. When the code generated by code generator 38 matches the code of the received signal, a peak is seen in the correlated signal generated by correlator 37. The output of correlator 37 is then processed by a processor, for example a combined microcontrol unit/digital signal processor (MCU/DSP).

It should be noted that in an alternative embodiment as indicated by dashed lines intermediate frequency local oscillator 35 may be omitted, and the corresponding signal may be derived from radio frequency PLL 25 via a frequency divider 29 as indicated by dashed arrow 28.

Next, the second mode of operation will be described. In the second mode of operation, a code generator 41 which is in the embodiment of FIG. 2 a "duplicate" of code generator 38, i.e. operates in the same manner and may be implemented using e.g. the same or similar hardware, generates signal codes for testing purposes. These codes in the embodiment of FIG. 2 are modulated on the signal with the intermediate frequency generated by local oscillator 35 (or alternatively onto the frequency divided signal received as indicated via arrow 28), for example on a 4.092 MHz intermediate signal, using an exclusive or gate 42. This corresponds to a BPSK-modulation (Binary Phaseshift Keying). The thus generated digital modulated signal is fed to a digital pad 43. In other embodiments, a different frequency than the intermediate frequency may be used for this modulation.

Through the exclusive or function provided by gate 42 and/or properties of the digital signal pad 43, the signal path is non-linear. Therefore, besides the signal at the frequency of local oscillator 35, higher harmonics of this signal are output.

Signal pad 43 in the embodiment of FIG. 2 acts as a transmit antenna, and the corresponding signal as indicated by an arrow 44 is received by antenna 21. Bandpass filter 22 then essentially lets only a higher harmonic corresponding to the radio frequency pass. In GPS systems with an intermediate frequency of 4.092 MHz as mentioned above this may for example be the $385^{th}$ harmonic. However, these numerical values serve only as examples, and generally any frequency is possible. The received signals are then processed via the receive path comprising portions 30 and 31 as explained for the first mode of operation. As the transmitted codes generated by code generator 41 are known, the thus received signal may be used for testing the correct behavior of the GPS receiver.

Therefore, similar to the embodiment of FIG. 1, also in the embodiment of FIG. 2 a test signal is generated using a second frequency (frequency of local oscillator 35 or output by frequency divider 29), and a higher harmonic of the thus generated test signal is used as a test signal at a first frequency (radio frequency) which is higher than the second frequency.

Figure 3:
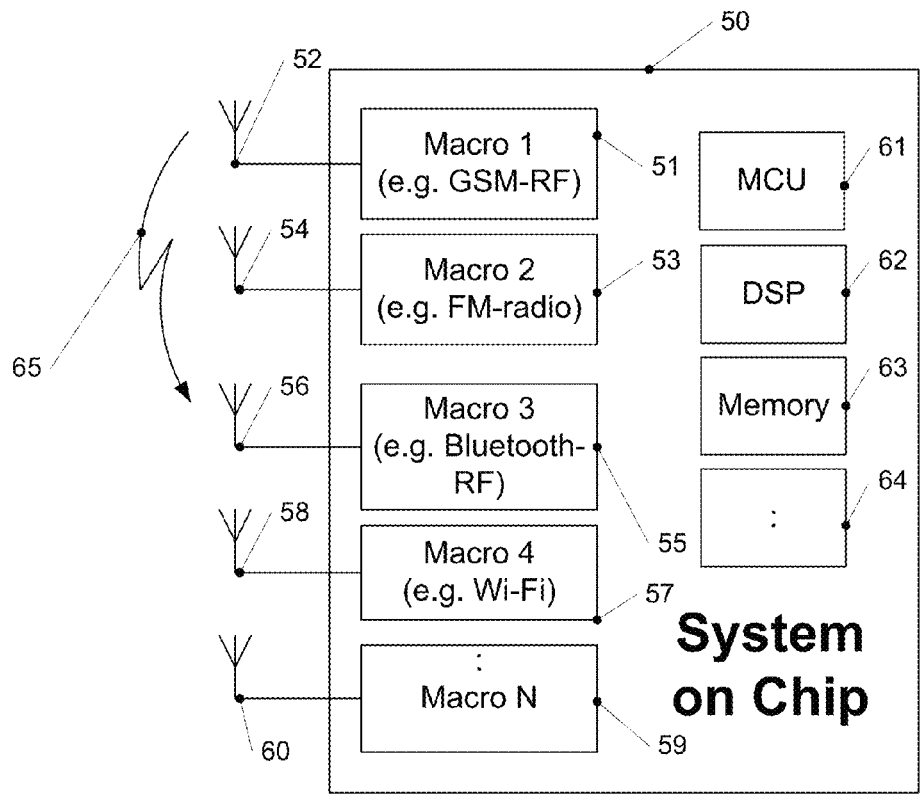
FIG. 3 shows a block diagram of a communication device according to another embodiment.

Another application of this principle is shown in FIG. 3. FIG. 3 shows a system on chip (SoC) 50 comprising functionalities, so-called macros, for various wireless services. A similar device may also be implemented as a system in package (SiP) in another embodiment. For example, in the embodiment of FIG. 3 a first macro 51 for GSM (Global System for Mobile Communication) cellular phone services, a second macro 43 for FM (frequency modulation) radio receiving, a third macro 54 for Bluetooth communication, a fourth macro 57 for WiFi communication, for example for accessing a wireless LAN, up to an n-th macro 59 (for example a UMTS communication macro) are shown. It should be noted that in other embodiments only some of these macros or more macros may be present. Each macro performs wireless communication via an antenna 52, 54, 56, 58 or 60 as shown in FIG. 3. It should be noted that some macros may share a common antenna. Furthermore, the system on chip 50 comprises a MCU 61, a DSP 62, a memory 63 and may also comprise further components 64, for example interfaces and the like. A system on chip as shown in FIG. 3 may be used for cellular phones.

The various macros operate at different frequencies which are, for example for GSM and Bluetooth, defined in various standards or which are even tunable in a certain range like for FM radios. In embodiments of the present invention, a macro using a lower transmit frequency may generate a test signal, and a macro using a higher receive frequency may receive a higher harmonic of this test signal and use it for testing purposes. For example, as indicated by an arrow 65, a Bluetooth macro may use a higher harmonic of a test signal generated by a GSM macro. In the example shown in FIG. 3, for example a Bluetooth macro may use the third harmonic of the GSM macro for testing purposes.

For example, to generate the test signals in FIG. 3 slight modifications of carrier frequencies and/or slight modifications of modulation sequences of transmitters of the macro may be used. Furthermore, not only the receive path of the macro with the higher receive frequency, but also a corresponding transmit path generating the test signal of the macro using the lower frequency may be tested in this way.

Depending on the modulation used, for example GFSK (Gaussian Frequency Shift Keying) modulation in case of GSM, a change of modulation index in higher harmonics may be pre-compensated.

To further illustrate the principles and embodiments described above, FIGS. 4-9 show simulations for signals for an embodiment similar to the one of FIG. 2, i.e. an embodiment where a test signal is generated by BPSK using an exclusive or gate.

Figure 4:
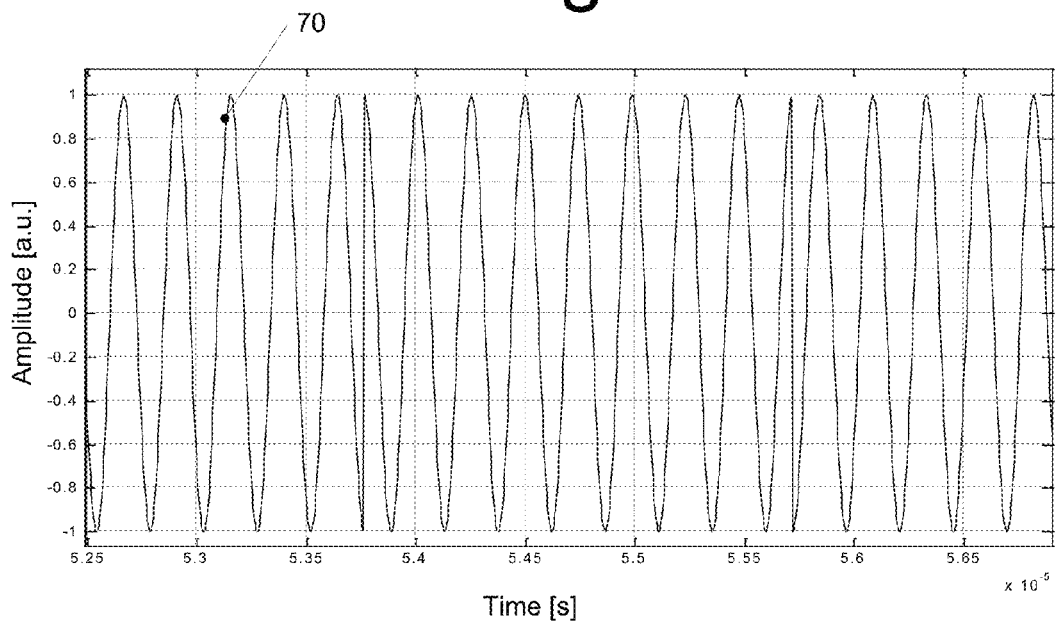
FIGS. 4-9 show examples for signals in an embodiment.
Figure 5:
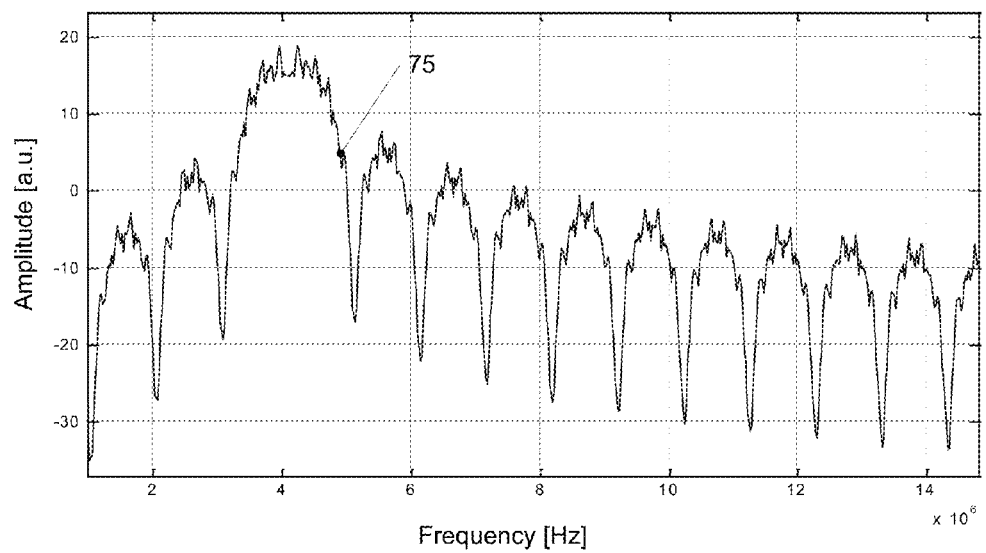

A curve 70 in FIG. 4 shows a BPSK modulated signal at an intermediate frequency $f_{IF\_MOD}(t)$ according to $$f_{IF\_MOD}(t)=\cos(\omega_{IF}t+\pi \cdot c_i) \quad (1)$$

wherein t is the time, $\omega_{IF}$ is the intermediate frequency, in the simulation example 4.092 MHz, corresponding for example to the output frequency of oscillator 35 of FIG. 2, and $c_i$, are the so-called code chips, i.e. elements for example of a spreading code generated by code generator 41 of FIG. 2, which in the example shown may be either 0 or 1. The duration of one code value in the example used, which is also referred to as chip duration $T_{chip}$ is 1/1.023 MHz in the simulation example shown.

FIG. 4 shows the spectrum of the thus generated signal. The main peak is at the corresponding oscillator frequency, i.e. 4.092 MHz, with higher harmonics shown in curve 75.

Figure 6:
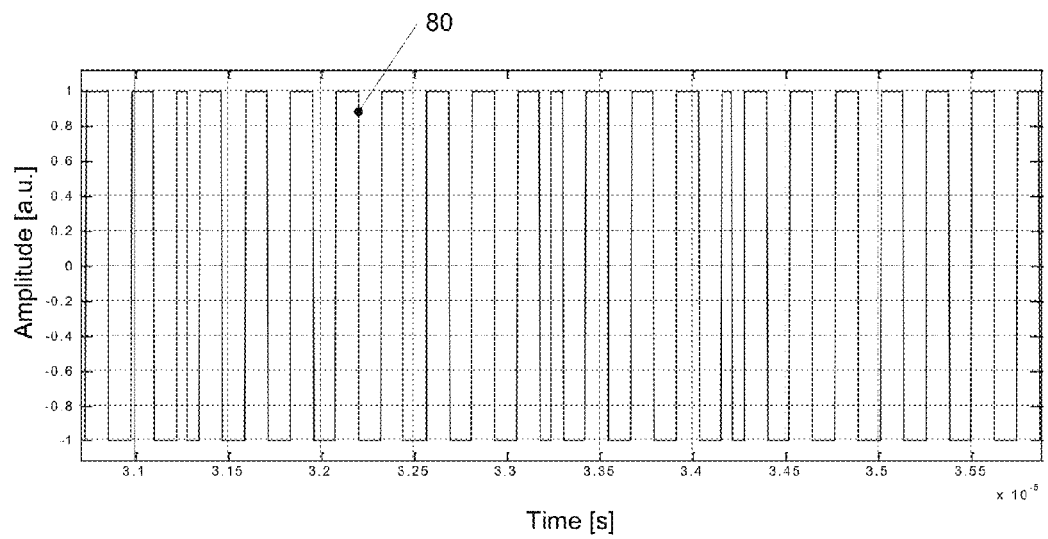

In FIG. 6 a curve 80 shows the corresponding digital signal at pad 43, which basically corresponds to the sign of curve 70 of FIG. 4. In other words curve 80 may be described by a function $f_{PADOUT}(t)$ according to $$f_{PADOUT}(t)=\text{sign}(f_{IFMOD}(t))=\text{sign}(\cos(\omega_{IF}t+\pi \cdot c_i)) \quad (2)$$

Figure 8:
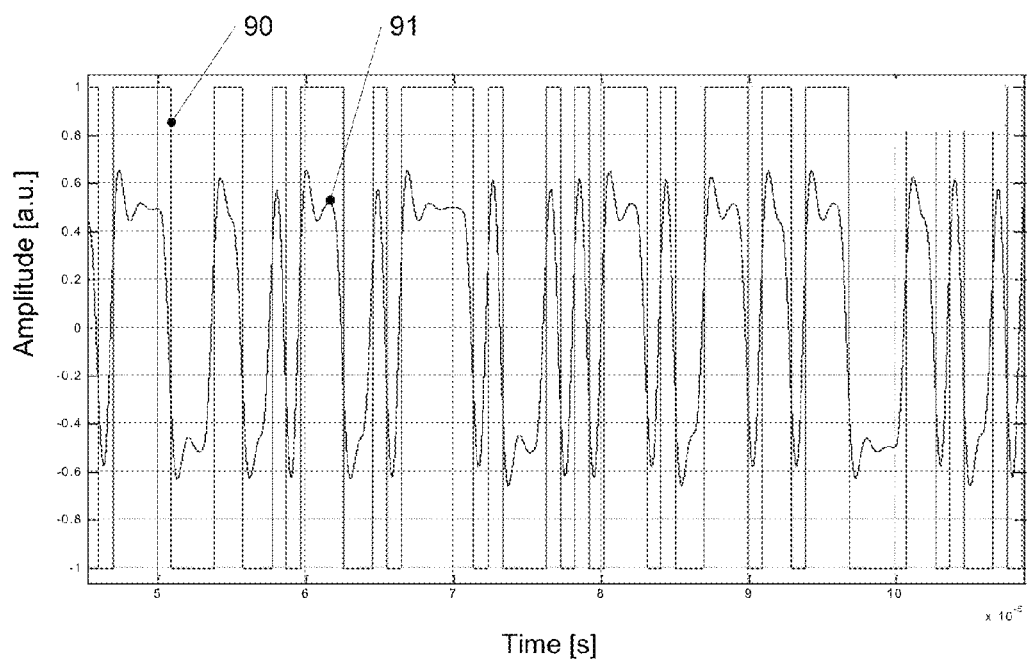

In the representation of FIG. 8 +1 and −1 have been used as the output values of the digital signals, but any other two values, for example 0 and 1 or any voltage values, for example 0 V and a pad voltage $V_{PADOUT}$ are equally possible.

Figure 7:
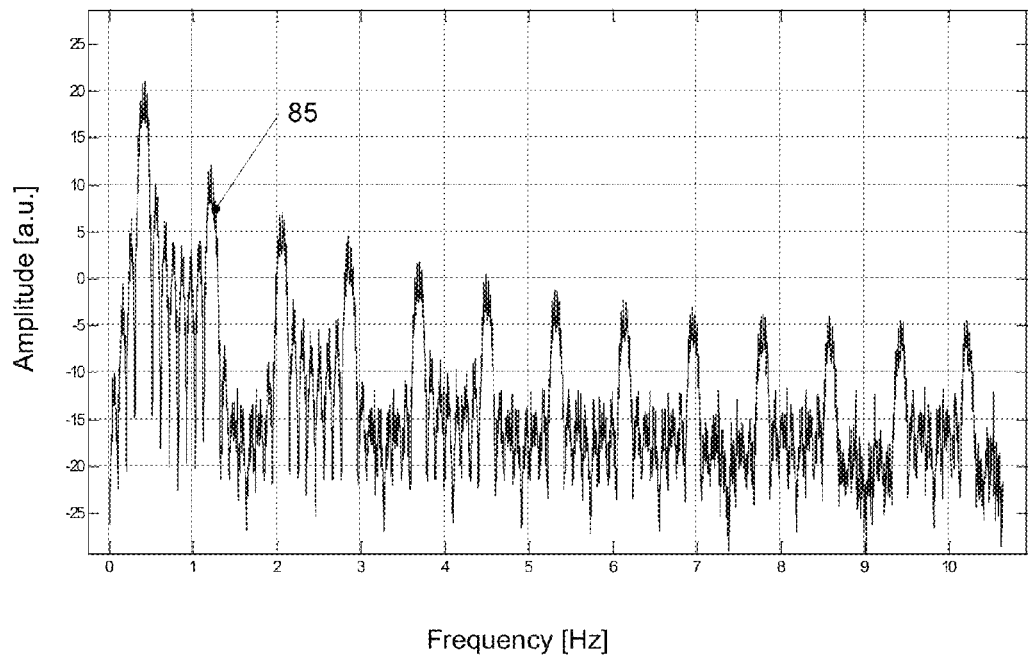
Figure 9:
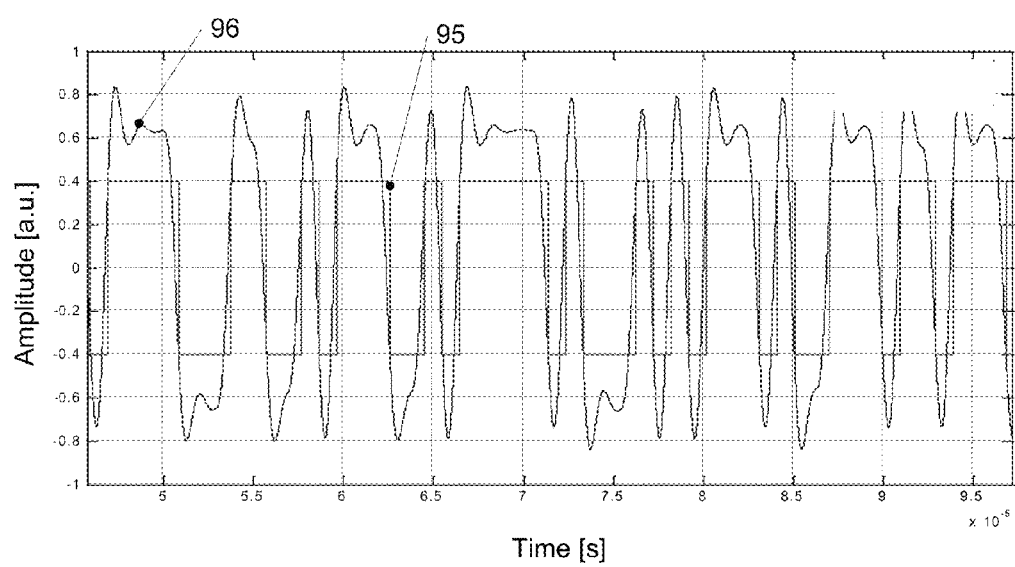

In FIG. 7 the spectrum of the digital signal of FIG. 6 is shown by a curve 85. Similar to FIG. 5, the strongest peak is at the frequency of the local oscillator signal used, i.e. 4.092 MHz, and higher harmonics with decaying signal strength are also shown. In FIG. 8 a demodulation at the local oscillator frequency is shown as an example, wherein curve 90 shows the original digital signal and curve 91 shows the demodulated signal. In FIG. 9 the corresponding demodulation for the 15$^{th}$ harmonic is shown, curve 95 again showing the original digital signal and curve 96 showing the demodulated signal. As can be seen, also for higher harmonics the demodulation is possible. It should be noted that the numerical values given in the simulation of FIGS. 4-9 serve only for further illustrating some concepts of the present invention and are not to be construed as limiting, as other values are equally possible.

The above concepts for testing may be used both during, for example at the end of, production and during normal operation, for example for regular self-tests.

In view of the various modifications and variations described above, the scope of the present application is construed not to be limited by the embodiments described, but is construed to be limited only by the appended claims and equivalents thereof.

What is claimed is:

1. A communication device, comprising:
   a first circuit portion comprising one or more components and configured during a regular mode to wirelessly receive and process communications signals at or near a first frequency;
   a second circuit portion comprising one or more components configured, during the regular mode, to wirelessly receive and process communication signals at or near a second frequency greater than the first frequency;
   wherein during a test mode, the first circuit portion is further configured to generate and wirelessly output a test signal comprising one or more harmonics at or around integer multiples of the first frequency with at least one harmonic of the test signal at or near the second frequency,
   wherein at least one circuit component of the first circuit portion used to receive or process communication signals at or near the first frequency during the regular mode has an inherent non-linearity that produces the one or more harmonics of the test signal during the test mode, and
   wherein during the test mode, the second circuit portion is further configured to wirelessly receive and thereafter process for test purposes the at least one harmonic of the test signal at or near the second frequency.

2. The communication device of claim 1, wherein said first circuit portion comprises an oscillator oscillating at said first frequency, and a modulator coupled with said oscillator.

3. The communication device of claim 1, wherein said communication device is configured to test at least one function of the group comprising sending of signals and receiving of signals based on said test signal.

4. The communication device of claim 1, wherein said communication device is at least one of a GPS receiver, a system on chip or a system in package.

5. The communication device of claim 1, wherein the at least one circuit component of the first circuit portion is a terminal.

6. The communication device of claim 1, wherein the at least one circuit component of the first circuit, portion is a logic gate.

7. The communication device of claim 1, wherein the at least one circuit component of the first circuit portion is a limiter.

8. A method, comprising:
  receiving at a first antenna communication signals at or near a first frequency;
  processing the communications signals received at or near the first frequency;
  generating a test signal,
  wirelessly outputting the test signal via the first antenna,
    wherein the test signal comprises one or more harmonics at or around integer multiples of the first frequency with at least one harmonic at or near a second frequency,
    wherein the one or more harmonics of the test signal are produced by an inherent non-linearity of a circuit component used to receive or process the communication signals at or near the first frequency,
  wirelessly receiving via a second antenna and thereafter processing, the at least one harmonic of the test signal at or near the second frequency,
  wherein the second frequency is greater than the first frequency.

9. The method of claim 8, wherein said generating and said receiving are performed in the same device.

10. The method of claim 9, wherein said device is at least one of a receiver, a system on chip or a system in package.

11. The method of claim 8, wherein said generating comprises modulating a local oscillator signal.

12. The method of claim 11, wherein said processing comprises mixing a signal with said local oscillator signal.

\* \* \* \* \*

UNITED STATES PATENT AND TRADEMARK OFFICE
CERTIFICATE OF CORRECTION

| | | |
|---|---|---|
| PATENT NO. | : 8,831,071 B2 | Page 1 of 1 |
| APPLICATION NO. | : 12/690909 | |
| DATED | : September 9, 2014 | |
| INVENTOR(S) | : Markus Hammes et al. | |

It is certified that error appears in the above-identified patent and that said Letters Patent is hereby corrected as shown below:

In the Claims

Claim 6 - Column 7, line 15: delete "," between "circuit" and "portion".

Claim 10 - Column 8, line 19: delete "at least one of a receiver" and write --at least one of a GPS receiver-- in place thereof.

Signed and Sealed this
Sixteenth Day of June, 2015

Michelle K. Lee
*Director of the United States Patent and Trademark Office*